(12) United States Patent
Zojer et al.

(10) Patent No.: US 8,908,752 B2
(45) Date of Patent: *Dec. 9, 2014

(54) LINE TESTING

(75) Inventors: Bernhard Zojer, Villach (AT); Thomas Ferianz, Bodensdorf (AT); Thomas Linder, Spittal (AT); Gerhard Noessing, Villach (AT)

(73) Assignee: Lantiq Deutschland GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/229,762

(22) Filed: Sep. 11, 2011

(65) Prior Publication Data

US 2012/0063499 A1    Mar. 15, 2012

Related U.S. Application Data

(63) Continuation of application No. PCT/EP2010/001453, filed on Mar. 9, 2010.

(51) Int. Cl.
*H04B 17/00* (2006.01)
*H04M 3/30* (2006.01)

(52) U.S. Cl.
CPC .................................. *H04M 3/305* (2013.01)
USPC ........................................................ 375/224

(58) Field of Classification Search
USPC ........................................................ 375/224
See application file for complete search history.

(56) References Cited

U.S. PATENT DOCUMENTS

| | | | |
|---|---|---|---|
| 6,715,087 B1 * | 3/2004 | Vergnaud et al. | 713/300 |
| 7,365,547 B2 * | 4/2008 | Ferianz | 324/538 |
| 8,339,145 B2 * | 12/2012 | Noessing et al. | 324/539 |

FOREIGN PATENT DOCUMENTS

| | | |
|---|---|---|
| CN | 101379806 A | 3/2009 |
| DE | 102004032210 A1 | 1/2006 |
| EP | 10802089 A1 | 11/2007 |

* cited by examiner

*Primary Examiner* — Michael Neff (57) ABSTRACT

Embodiments related to line testing are described and depicted. A digital subscriber line testing apparatus comprises a plurality of resistors and a switching device. The switching device comprises first and second signal inputs to couple the switching device to a signal generator output, and a plurality of wire terminals. The switching device is configured to switch the plurality of resistors into a first switching state and a second switching state.

12 Claims, 5 Drawing Sheets

Fig. 1

200 switching the plurality of resistors to a first state such that a first output of the signal generator entity is connected via a first resistor to a first wire of a first line and a second ouput of the signal generator is connected via a second resistor of the plurality of resistors to a second wire of the first line
202 providing in the first state one or more signals from the signal generator entity to the first digital subscriber line
204 switching the plurality of resistors to a second state in which the first output of the line test entity is connected via a third resistor of the plurality of resistors to a first wire of a second digital subscriber line and the second output of the line test entity is connected via a fourth resistor of the plurality of resistors to a second wire of the second digital subscriber line
206 providing in the first state one or more signals from the signal generator entity to the second digital subscriber line
208

LINE TESTING

PRIORITY CLAIM

This Application is a Continuation Application of PCT Application No. PCT/EP2010/001453, which was filed on Mar. 9, 2010. The entire contents of the PCT Application are hereby incorporated herein by reference.

BACKGROUND

Digital Subscriber line (DSL) systems are widely used to transmit digital data to users at home. Various standards such as ADSL and VDSL have been provided and are currently developed for transmitting the data in duplex communication such as for example by using a discrete multitone modulation. Typically, a DSLAM at the operator's side (Digital Subscriber Line Access Multiplexer) provides connection over a plurality of lines to a plurality of transceivers at the costumer premise equipment (CPE). A DSLAM may be implemented in an Optical Network Unit (ONU), a Central Office (CO), a cabinet, an exchange or other types of network termination devices at the operator's end.

The line connecting the DSLAM and the CPE is typically a pair of twisted wires made of copper also sometimes referred to as twisted pair line. In order to enable communication over the line, loop maintenance is necessary and required by some regulatory bodies. Loop maintenance includes several measurements and tests, which are performed in order to determine the electrical line conditions and to discover any malfunction of the line. Such testing includes for example testing of electrical line parameters which are herein referred to as line tests. Furthermore, in order to prevent galvanic corrosion of the metallic lines and oxidization at splices, a small DC line current also referred to as wetting or sealing current may be provided periodically.

In existing systems, DSL is provided together with plain old telephone service (POTS) by utilizing different frequency bands for POTS and DSL and separating the signals by means of filters. While the DSL system is connected to the line via a high-pass filter and a transformer, POTS still provides a DC-connection, which can be used to perform line tests or to directly inject the wetting current into the line. However, with the increasing trend of utilizing DSL based voice communication, such as Voice over IP (VoIP), future DSL systems will more and more be provided without POTS.

SUMMARY

The independent claims define the invention in various aspects. The dependent claims define various embodiments of the invention. Features of the various embodiments may be combined with each other, unless otherwise noted.

In a first aspect the invention encompasses a method comprising switching a plurality of resistors to a first state. In the first state a first output of a test signal generator is connected via a first resistor of the plurality of resistors to a first wire of a first digital subscriber line of a plurality of subscriber lines. A second output of the test signal generator is connected via a second resistor of the plurality of resistors to a second wire of the first digital subscriber line. The method further comprises providing in the first state one or more signals from the test signal generator to the first digital subscriber line and measuring the resulting signals on the first digital subscriber line. The method comprises switching the plurality of resistors to a second state. In the second state the first output of the test signal generator is connected via a third resistor of the plurality of resistors to a first wire of a second digital subscriber line. The second output of the test signal generator is connected via a fourth resistor of the plurality of resistors to a second wire of the second digital subscriber line. The method further comprises providing in the second state one or more signals from the test signal generator to the second digital subscriber line and measuring the resulting signals on the second digital subscriber line.

In an embodiment of the method according to the invention, the method comprises, after providing one or more signals in the first state, connecting the first wire of the first digital subscriber line to ground and connecting the second wire of the first digital subscriber line to ground. In this embodiment the method comprises disconnecting the first output of the test signal generator from the first wire of the first digital subscriber line and disconnecting the second output of the test signal generator from the second wire of the first digital subscriber line. In an embodiment of the method, in the first state the second subscriber line is connected to ground via the third and fourth resistors. In an embodiment of the method, during a transition from the first to the second state, the first wire of the first digital subscriber line is connected via the first resistor both to ground and to the first output of the test signal generator; the second wire of the first digital subscriber line is connected via the second resistor both to ground and to the second output of the test signal generator, the first wire of the second digital subscriber line is connected via the third resistor both to ground and to the first output of the test signal generator, and the second wire of the second digital subscriber line is connected via the fourth resistor both to ground and to the first output of the test signal generator.

In an embodiment of the method according to the invention, the value of the first, second, third and fourth resistor is between 5 kOhm and 50 kOhm. In an embodiment of the method, the switching is provided by controlling a matrix of switches. In an embodiment of the method, a resistance value of the switches in on-state is significantly lower than the resistance value of the first, second, third and fourth resistor.

In an embodiment of the method according to the invention, in the first state, a first signal transmitted between the first output of the test signal generator and the first wire of the first digital subscriber line and a second signal transmitted between the second output of the test signal generator and the second wire of the first digital subscriber line, are substantially not low-pass filtered.

In an embodiment of the method according to the invention, the method comprises controlling the test signal generator in the first state to output a signal inducing a wetting current in the first and second wires of the first digital subscriber line via the first and second resistors. In an embodiment of the method, the method further comprises controlling the test signal generator in the second state to output a signal inducing a wetting current in the first and second wires of the second digital subscriber line via the third and fourth resistors. In an embodiment of the method the test signal generator includes a first and second amplifier, wherein the first and second amplifier are controlled to provide a wetting current as well as metallic line test signals in the first and second states.

In an embodiment of the method according to the invention, the method comprises measuring a voltage induced by the one or more signals in the first state at the first and second wires of the first digital subscriber line and determining metallic line testing parameters based on the measured voltages. In an embodiment the method further comprises measuring a voltage induced by the one or more signals in the second state at the first and second wires of the second digital subscriber line and determining one or more metallic line testing parameters based on the measured voltages.

An embodiment of the method according to the invention comprises providing in the first state one or more signals, measuring the resulting signals on the first digital subscriber line and determining one or more metallic line testing parameters based on the measurement. An embodiment of the method comprises providing in the second state one or more signals, measuring the resulting signals on the second digital subscriber line and determining one or more metallic line testing parameters based on the measurement.

In an embodiment of the method according to the invention the one or more signals are provided in the first switching state during a digital data communication on at least the first digital subscriber line and the one or more signals are provided in the second switching state during a digital data communication on at least the second digital subscriber line.

In a second aspect the invention encompasses a digital subscriber line testing apparatus comprising a plurality of resistors and a switching device. The switching device comprises first and second signal inputs to couple the switching device to a signal generator output, and a plurality of wire terminals. The switching device is configured to switch the plurality of resistors into a first switching state. In the first switching state the first signal input is connected via a first resistor of the plurality of resistors to a first wire terminal, the first wire terminal being associated with a first wire of a first digital subscriber link, and the second signal input is connected via a second resistor of the plurality of resistors to a second wire terminal, the second wire terminal being associated with a second wire of the first digital subscriber link. Further, the switching device is configured to switch the plurality of resistors into a second switching state in which the first signal input is connected via a third resistor of the plurality of resistors to a third wire terminal, the third wire terminal being associated with a first wire of a second digital subscriber link and the second signal input is connected via a fourth resistor of the plurality of resistors to a fourth wire terminal, the fourth wire terminal being associated with a second wire of the second digital subscriber link. The apparatus is thus adapted to allow for metallic line testing during DSL transmission on the line under test. In an embodiment, no low-pass filter is present, since ohmic resistors provide a resistance value sufficiently high for the line testing to have no influence or, from a practical point of view, merely negligible influence on DSL transmission.

An embodiment of the line testing apparatus further comprises a first and a second amplifier, the first amplifier being connected to the first signal input of the switching device and the second amplifier being connected to the second signal input of the switching device. In an embodiment of the line testing apparatus, the switching device is configured to switch the plurality of resistors in such a way that, in the first switching state, the third wire terminal is connected via the third resistor to a ground connection and the fourth wire terminal is connected via the fourth resistor to a ground connection; and, in the second switching state, the first wire terminal is connected via the first resistor to a ground connection and the second wire terminal is connected via the second resistor to a ground connection. In an embodiment of the line testing apparatus the switching device is configured to switch the plurality of resistors in such a way, that in a transition from the first to the second switching state, the resistors are concurrently connected to both the respective signal input of the switching device and to ground via their respective switches.

An embodiment of the line testing apparatus according to the invention comprises a control circuit to control the signal generator to selectively supply in a first operation mode metallic test signals to the first digital subscriber line, when the switching device is in the first switching state, and in a second operation mode to supply a wetting current to the first digital subscriber line, when the switching device is in the first switching state.

In an embodiment of the line testing apparatus according to the invention, the first, second, third and fourth resistor each comprise a resistance value between 5 kOhm and 50 kOhm. In an embodiment of the line testing apparatus according to the invention the switching device is a first switching device, and the line testing apparatus further comprises a voltage sensing entity to sense a voltage on a digital sub-scriber line, a second switching device to connect selected digital subscriber lines to the voltage sensing entity, and a controller to control the first and second switching devices to connect the voltage sensing entity and the signal input to the same digital subscriber line. An embodiment of the line testing apparatus further comprises a current sensing entity to sense a current provided by the signal generators, Therein the controller is further configured to evaluate test results based on the sensed voltage and current.

An embodiment of the line testing apparatus according to the invention is configured to supply the signals from the signal generators without low-pass filtering to a respectively connected digital subscriber line.

In a third aspect the invention encompasses a DSL system comprising a first and second digital subscriber line, a first transceiver at a first end of a first digital sub-scriber line, a second transceiver at the first end of a second digital subscriber line; and a digital subscriber line testing apparatus. The digital subscriber line testing apparatus comprises a plurality of resistors and a switching device. The switching device comprises a signal input to couple the switching device to a signal generator output and a plurality of wire terminals. In an embodiment of the DSL system, the switching device is configured to switch the plurality of resistors into a first switching state, in which the first signal input is connected via a first resistor of the plurality of resistors to a first wire terminal, the first wire terminal being associated with a first wire of a first digital subscriber line, and the second signal input is connected via a second resistor of the plurality of resistors to a second wire terminal, the second wire terminal being associated with a second wire of the first digital subscriber link. The switching device is further configured to switch the plurality of resistors into a second switching state, in which the first signal input is connected via a third resistor of the plurality of resistors to a third wire terminal, the third wire terminal being associated with a first wire of a second digital subscriber line, and in which the second signal input is connected via a fourth resistor of the plurality of resistors to a fourth wire terminal, the fourth wire terminal being associated with a second wire of the second digital subscriber link.

In a fourth aspect the invention encompasses a digital subscriber line testing device comprising a plurality of resistance elements, each resistance element of the first plurality of resistance elements corresponding to a respective wire of a plurality of digital subscriber lines, a first plurality of switches electrically connected to the plurality of resistance elements, a second plurality of switches coupled to the plurality of resistance elements to selectively connect the plurality of resistance elements to ground, and a line testing signal generator to provide line testing signals to the first plurality of switching elements. An embodiment of the digital subscriber line testing device according to the invention comprises a current sensing entity to measure the current provided by the signal generator, a voltage sensing entity to sense a voltage on a digital sub-scriber line, and a third plurality of switches to electrically connect a line under test to the voltage sensing entity.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims. In the exemplary embodiments shown in the drawings and described below, functional blocks may be implemented in hardware, firmware, software, or a combination thereof, unless otherwise noted. In the various figures, identical or similar entities, modules, devices etc. may have assigned the same reference number. The embodiments described below are directed to a new concept for providing metallic line testing witch can be applied for DSL-systems without POTS.

Figure 1:
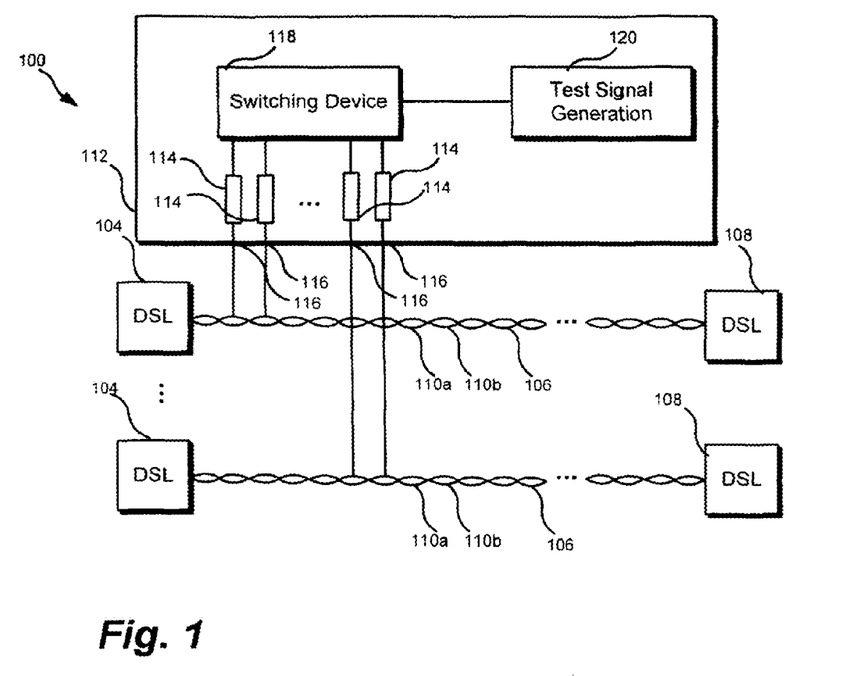
FIG. 1 shows a block diagram according to an exemplary embodiment.

Referring now to FIG. 1, a first embodiment of a DSL system will be described. FIG. 1 shows a DSL system 100 having at the operator side a plurality of transceivers 104. The transceivers 104 may be implemented in a DSLAM (digital subscriber line access multiplexer) which may be provided for example in an Optical Network Unit (ONU), a Central Office (CO), a cabinet, an exchange or other types of network termination devices at the operator's end. Each of the plurality of transceivers 104 is connected via a DSL line 106 to a respective one out of a plurality of transceivers 108 at the CPE (Costumer Premise Equipment). Each DSL line 106 has a pair of twisted first and second wires 110a and 110b, which are also referred to as tip and ring.

The DSL system 100 includes a test entity 112 at the side of the transceivers 104. The test entity 112 has a plurality of resistors 114. The plurality of resistors may be a resistor matrix. The plurality of resistors may include any known type of resistors including discrete resistors or resistors integrated on a semiconductor chip. The resistors may be made of any material or composition such as a metal, a semiconductor such as polysilicon etc.

Each of the resistors 114 corresponds to a wire of each line of the system and is connected via a respective line terminal 116 of the test entity to the corresponding wire. While FIG. 1 shows exemplarily only 4 resistors which are connected via line terminals 116 to the respective wires, it is to be understood that any other number of resistors may be provided.

The test entity 112 further includes a switching device 118 which is coupled to the plurality of resistors and a test signal generator 120. The switching device is capable of selectively switching a line (line under test) to the test signal generator, while disconnecting all other lines of the DSL-system, which are currently not tested. As will be outlined in more detail below, the switching device may in one embodiment be capable of switching each line currently not to be tested via a further resistor to ground. The test signal generator 120 is capable of generating test signals for performing metallic line testing on the respective line under test, which is connected to the test signal generator 120 via resistors 114 and the switching device 118. Metallic line testing includes measuring at least one or more of parameters such as line capacitance, line resistance, foreign voltages, loop length and loop gauge. Metallic line testing is based on feeding test signals to the line and measuring the resulting line currents or voltages. The metallic line parameters are determined from the measured current and voltage by using appropriate algorithms known in the art. Line capacitance may be measured between the two wires of the line under test as well as between each wire of the line under test and ground. Line resistance may be measured between the two wires of a line under test and between each respective wire of the line under test and ground. In embodiments, the line test device is capable of inducing test signals via the resistors on the line and measuring line parameters as required by regulatory or standardization bodies such as the standard G.996.2 currently developed under the aegis of the ITU.

In addition to providing metallic line testing, line testing device 112 may also be capable of supplying a DC wetting current for a respective DSL line. Thus, via the resistors 114, the test signal generator 120 is capable of inducing a wetting current with a magnitude sufficient to prevent galvanic corrosion of the metallic lines and oxidization at splices. In one embodiment, the DC wetting current induced in the respective line is 2 mA or above.

In existing DSL systems with POTS, any impact of test signals on DSL transmission is avoided by providing the test signals through a low-pass filter, which represents a high impedance for DSL signals. The system as described with respect to FIG. 1 simultaneously allows metallic line testing and DSL transmission on the line under test without having to implement a low-pass filter, as this is substituted by ohmic resistors of a resistance value sufficiently high to have no influence on DSL transmission.

The resistance of the resistors 114 is in embodiments within a predetermined range. The predetermined range is determined according to one embodiment to be between 5 and 50 kOhm. In one embodiment, the predetermined range is between 7 kOhm and 30 kOhm. These ranges of resistance have been discovered by the inventors as taking best into account the tradeoff arising between having a resistance value which on the one hand is sufficiently high compared to the characteristic impedance of the digital subscriber line and on the other hand is sufficiently low to fulfill the requirements on line test accuracy and wetting current. The resistance selected may be in embodiments the same for each resistor.

Figure 2:
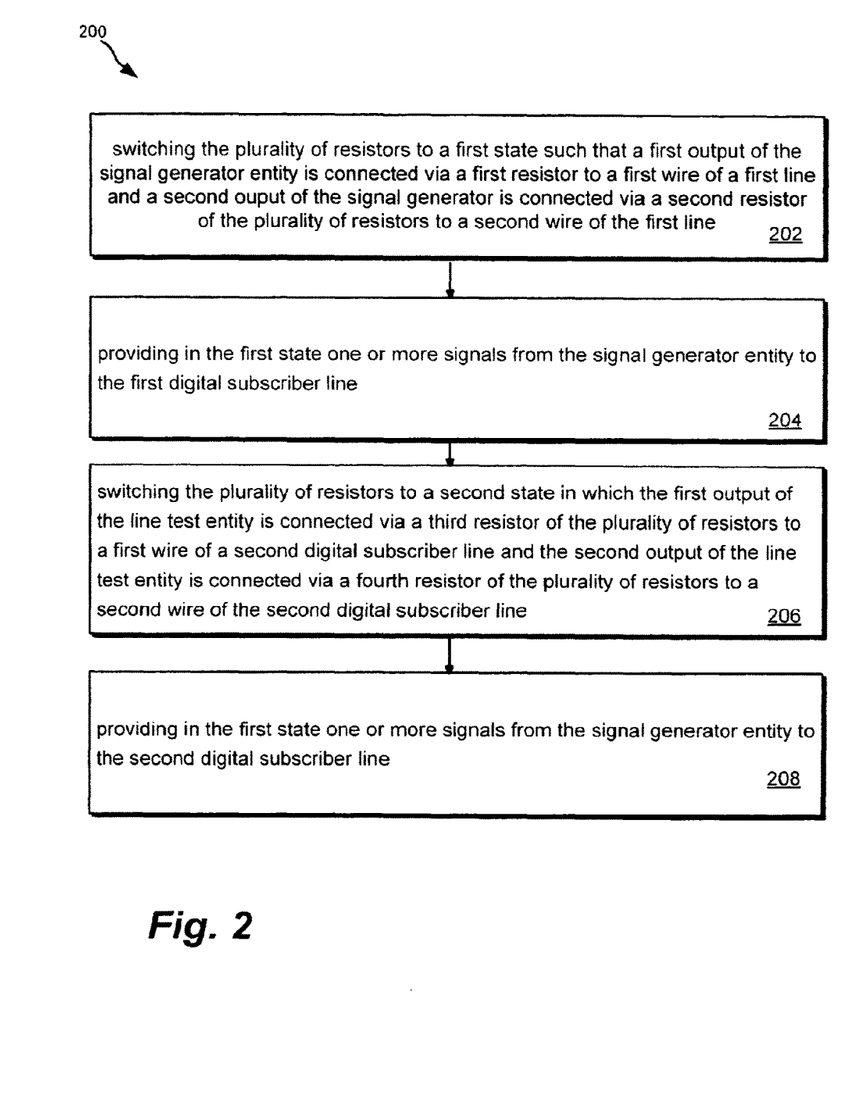
FIG. 2 shows a flow chart diagram according to an exemplary embodiment.

Referring now to FIG. 2, an exemplary flow diagram 200 will be described. The flow diagram 200 starts at 202 by switching the plurality of resistors 114 to a first state, in which a first output of the test signal generator entity is connected via a first resistor of the plurality of resistors to a first wire of a first digital subscriber line and a second output of the test signal generator entity is connected via a second resistor of the plurality of resistors to a second wire of the first digital subscriber line.

At 204, one or more signals are provided in the first state from the signal generator entity to the first digital subscriber line. As described above, in embodiments the signals may be DC or AC signals and may induce metallic line test signals or wetting currents in the respectively connected line. In one embodiment, the voltages and/or currents induced on the line are measured and the line test parameters are determined from the measured voltages and/or currents.

At 206, the plurality of resistors is switched to a second state in which the first output of the line test entity is connected via a third resistor of the plurality of resistors to a first wire of a second digital subscriber line and the second output of the line test entity is connected via a fourth resistor of the plurality of resistors to a second wire of the second digital subscriber line.

At 208, one or more signals are provided in the second state from the line test signal generator entity to the second digital subscriber line. In one embodiment, the voltages and/or currents induced on the line are measured and the line test parameters are determined from the measured voltages and/or currents.

As will be explained further below in more detail, in one embodiment the first wire of the first digital subscriber line is connected to ground and the second wire of the first digital subscriber line is connected to ground, after the signals have been provided to the line in the first state. The first output of the test signal generator is then disconnected from the first wire of the first digital subscriber line and the second output of the test signal generator is disconnected from the second wire of the first digital subscriber line. The first wire of the first digital subscriber line is thereby connected via the same first resistor to ground and the second wire of the first digital subscriber line is connected via the same second resistor to ground.

According to one embodiment, during a transition from the first to the second state, the first wire of the first digital subscriber line is connected via the first resistor and a first switch to ground and via the first resistor and a second switch to the first output of the test signal generator and the second wire of the first digital subscriber line is connected via the second resistor and a third switch to ground and via the second resistor and a fourth switch to the second output of the test signal generator. As will be further outlined below, this minimizes changes in line impedance caused by the testing or wetting procedure and thus enables simultaneous DSL transmission on the respective line.

Figure 3:
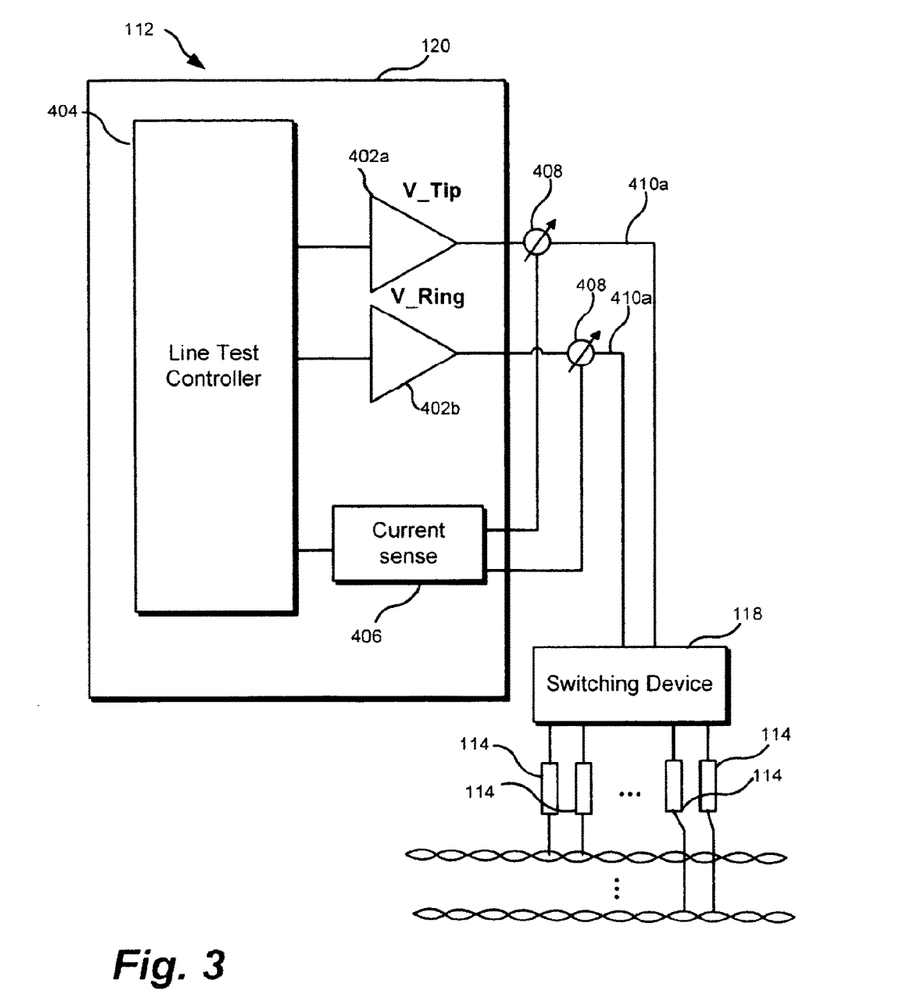
FIG. 3 shows a block diagram according to an exemplary embodiment.

Referring now to FIG. 3, an embodiment of a test entity 112 as used for example in the DSL system according to FIG. 1 will be described. FIG. 3 shows a test entity 112 having a test signal generator 120 implemented by a line test controller 404, a first amplifier 402a for outputting signals to the tip wire and a second amplifier 402b for outputting signals to the Ring wire of the respective line connected via the switching device 118. The amplifiers 402a and 402b are controlled by the line test controller 404. The amplifiers are configured and controllable to provide programmable band-limited voltages at their respective outputs. The output of the first amplifier 402a is connected via a first electrical connection 410a to a first input of the switching device 118 and the output of the second amplifier 402b is connected to a second input of the switching device 118 via a second electrical connection 410b.

For each of the electrical connections 410a and 410b, the current on the respectively connected wire is sensed and measured by means of current sense entity 406.

The current sense entity 406 is connected to the line test controller 404 to input the sensed current value. The sensed current values are used in the line test controller to determine the respective test parameters by using appropriate metallic line testing algorithms which are known in the art.

Figure 4:
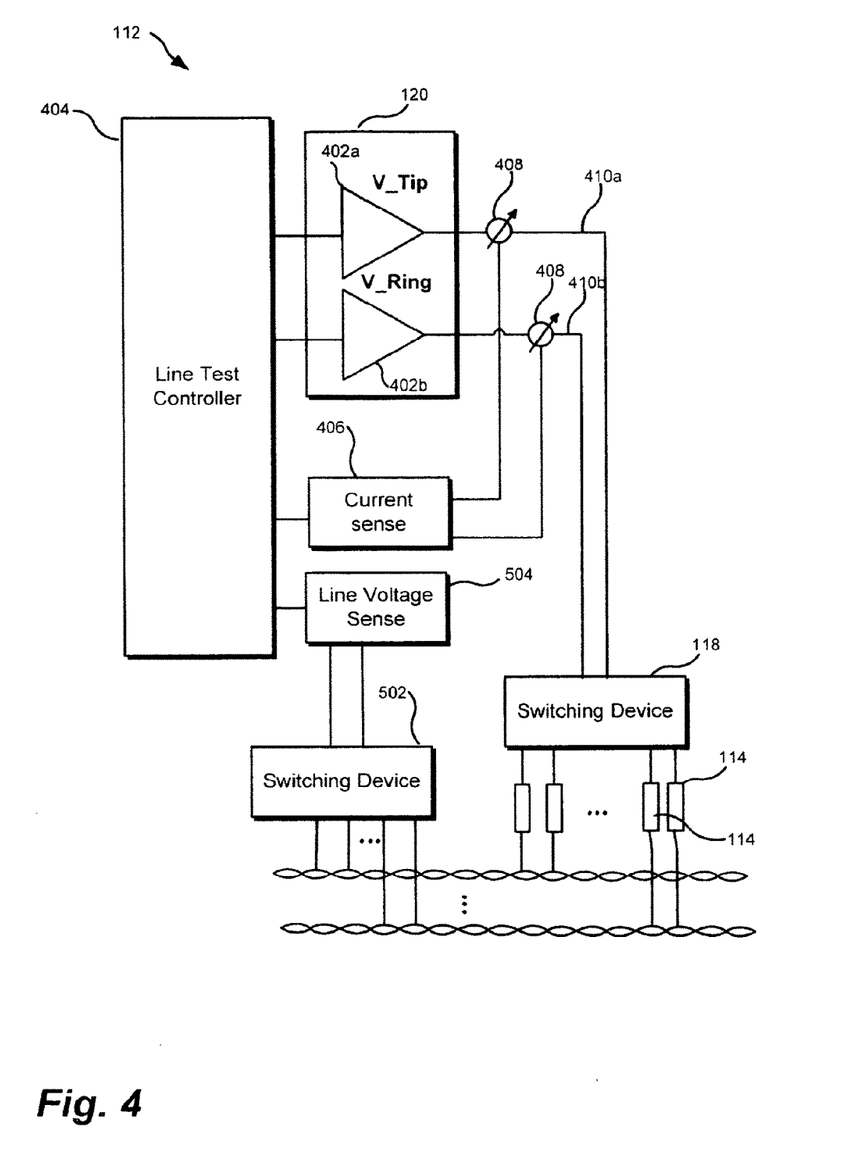
FIG. 4 shows a block diagram according to an exemplary embodiment.

Referring now to FIG. 4, a further embodiment of a test entity 112 will be described. In addition to sensing the current for the tested line, FIG. 4 implements a sensing of the line voltage for the tested line. Test entity 112 of FIG. 5 comprises a further switching device 502 which allows a selective connection to the wires of the DSL lines with a line voltage sense entity 504. The switching device 502 comprises a plurality of inputs which are connected to the tip and ring wires of each line of the DSL system. The switching device 502 comprises two outputs corresponding to tip and ring which are connected with the line voltage sense entity 504. The switch device may include a plurality of switches, which may also be regarded as a switch matrix. The switching device 502 is controlled to selectively connect the line voltage sense entity 504 with the tip and ring wires of the currently tested line while the other tip and ring wires of the DSL system are disconnected from the voltage sense entity 504. The line voltage sense entity 504 is coupled to the line via high impedances.

The measurement of the line voltage allows increasing the sensitivity of the test in case the resistance values of the resistors 114 are unknown or are subject to changes. The measured line voltage is transferred to the line test controller 504. The determined line characteristics are then calculated based on the current values taking into consideration the value of the resistors which are determined by utilizing the measured line voltage. In this embodiment, the line test controller 504 determines the parameters therefore not only based on the current sensed by current sense entity 406, but also based on a voltage sensed by line voltage sense entity 504. The line voltage measurement allows in one embodiment the basically equivalent implementation of line testing with currents rather than voltages fed to the line as the test signals.

Figure 5:
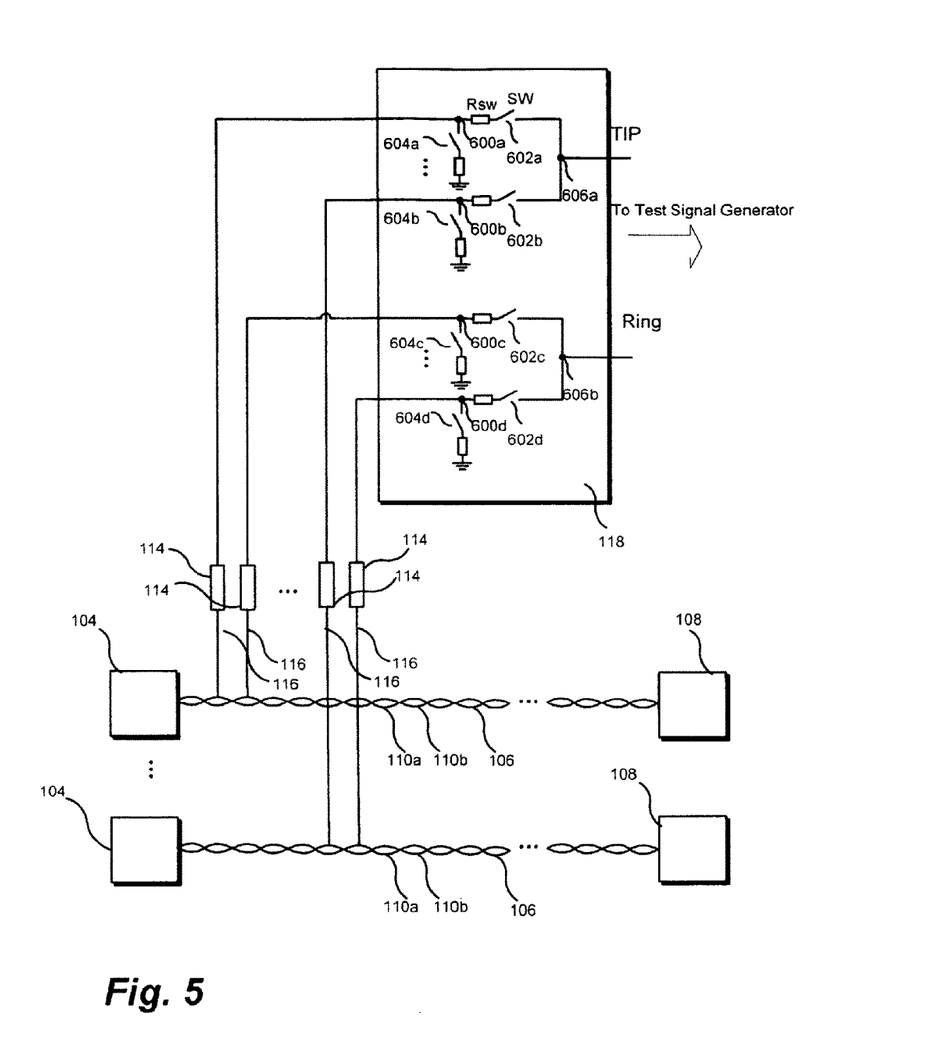
FIG. 5 shows a circuit diagram according to an exemplary embodiment.

Referring now to FIG. 5, an embodiment of the switching device 118 provided to switch the resistors 114 will be described. The switching device according to FIG. 5 includes a first plurality of switches 602a-d, each connected at a first end to a corresponding one of nodes 600a-d. The plurality of switches may be also regarded as a switch matrix. Each of the nodes 600a-d is connected to a respective one of the plurality of resistors. A first group of the switches from the first plurality of switches, which are in the embodiment of FIG. 5 the switches 602a and 602b, is provided for switching the tip wires of the digital subscriber lines and a second group of switches from the first plurality of switches, which are in the embodiment of FIG. 5 the switches 602c and 602d, is provided for switching the ring wires of the digital subscriber lines. At a second end, the first group of the switches is connected with a node 606a, which is connected to a first output of the signal generator for providing the signal to the tip wire connected by switching device 118, and the second group of the switches is connected to a second node 606b, which is connected to a second output of the signal generator for providing the signal to the ring wire connected by switching device 118.

The switching device comprises a second plurality of switches 604a-d, each being connected at a first end with a respective one of the nodes 600a-d. At a second end, each of the switches 604 is connected to ground. The switches of the first and second plurality of switches may be implemented by any known type of switches, including semiconductor 3-port devices such as bipolar or field effect transistors etc.

An exemplary controlling of the first and second switches will be explained in the following. When the switching device is switched into a first state, a first switch 602a of the first group of switches and a corresponding second switch 602c of the second group of switches is switched to "on", so that the two outputs of the signal generator are connected with the tip and ring wires of a first digital subscriber line. The other switches of the first plurality of switches, which are in the embodiment of FIG. 5 the switches 602b and 602d, are in the first state switched to "off" in order to disconnect the wires of all other digital subscriber lines from the signal generator. The two switches 604a and 604c of the second plurality of switches, which are connected to the tip and ring wires of the first digital subscriber line, are further switched to "off" in the first state, so that the tip and ring wires of the first digital subscriber line are disconnected from ground. All other switches of the second plurality of switches, i.e. switches 604b and 604d are switched to "on", so that the tip and ring wires of the other digital subscriber lines are connected to ground.

In a second state, another switch from the first group, which is in the embodiment of FIG. 5 the switch 602b, and a corresponding switch from the second group of switches, which is in the embodiment of FIG. 5 the switch 602d, is switched to "on", so that the two outputs of the signal generator are connected with the tip and ring wires of a second digital subscriber line. All other of the first plurality of switches, which are in the embodiment of FIG. 5 the switches 602a and 602c, are switched to "off" in the second state to disconnect the wires of all other digital subscriber lines from the signal generator. The two switches 604b and 604d of the second plurality of switches, which are connected in the second state to the tip and ring wires of the second digital subscriber line, are further switched to "off" in order to disconnect the tip and ring wires of the second digital subscriber line from ground. All other of the second plurality of switches, which are in the embodiment of FIG. 5 the switches 604a and 604c, are switched to "on", so that the tip and ring wires of the other digital subscriber lines are connected to ground.

The switching from the first to the second state is performed in such a way, that the two switches of the first and second plurality of switches, which are connected to the same wire, are not both in an "off" state at the same time. This secures, that during switching the respective wire of the digital subscriber line always has a low-impedance connection to either ground or the signal generator via the respective switch resistance. Therefore, in the transition from the first state to the second state, before the first and second switches 602a and 602c are switched from "on" to "off", the respective switches 604a and 604c, which are coupled to the first and second switches 602a and 602c, are switched from "off" to "on". Then the respective wire is connected for a short time to both ground and the signal generator. In the same way, the third and fourth switches 602b and 602d are switched from "off" to "on", before the switches 604b and 604d, which are connected to the third and fourth switches 602b and 602d, are switched from "on" to "off".

By implementing the switches of the first and second plurality of switches in such a way, that the value of the resistance during "on" is significantly lower than the value of the resistors 114, the above described switching with overlap between the switching states results in a nearly unchanged impedance of the subscriber line, not depending on whether the line is connected to or disconnected from the signal generator. This allows line testing or sealing current supply fully independent and simultaneous with the transmission of data on the digital subscriber line.

An exemplary implementation of the testing device may be provided by fully integrating the complete sensors, switches and signal generator circuits on a semiconductor chip. High-voltage IC-Processes as known in the art can be used for achieving such integration.

While in the above description and the figures a limited number of switches and resistors has been shown, it is to be understood, that in other embodiments the plurality of switches and resistors may include other numbers of switches and resistors.

In the above description, embodiments have been shown and described herein, enabling those skilled in the art in sufficient detail to practice the teachings disclosed herein. Other embodiments may be utilized and derived there from, so that structural and logical substitutions and changes may be made without departing from the scope of this disclosure. This Detailed Description, therefore, is not to be taken in a limiting sense, and the scope of various embodiments is defined only by the appended claims, along with the full range of equivalents, to which such claims are entitled. Such embodiments of the inventive subject matter may be referred to herein, individually and/or collectively, by the term "invention" merely for convenience and without intending to voluntarily limit the scope of this application to any single invention or inventive concept, if more than one is in fact disclosed. Thus, although specific embodiments have been illustrated and described herein, it should be appreciated, that any arrangement for achieving the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Specific terms used in the description and claims may be interpreted in a very broad sense. For example, the terms "circuit" or "circuitry" used herein are to be interpreted in a sense not only including hardware, but also software, firmware or any combinations thereof. The term "data" may be interpreted to include any form of representation, such as an analog signal representation, a digital signal representation, a modulation onto carrier signals etc. The term "entity" or "unit" may in embodiments include any device, apparatus circuits, hardware, software, firmware, chips or other semiconductors as well as logical units or physical implementations of protocol layers etc. Embodiments described in combination with specific entities may in addition to an implementation in these entities also include one or more implementations in one or more sub-entities or sub-divisions of said described entities. For example, specific embodiments described herein to be implemented in a transmitter, receiver or transceiver may be implemented in sub-entities such as a chip or a circuit provided in such an entity. The accompanying drawings, that form a part hereof, show by way of illustration, and not of limitation, specific embodiments in which the subject matter may be practiced. In the foregoing Detailed Description, it can be seen that various features are grouped together in a single embodiment for the purpose of streamlining the disclosure. This method of disclosure is not to be interpreted as reflecting an intention, that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim. Such combinations are proposed herein, unless it is stated that a specific combination is not intended. It is further to be noted, that methods disclosed in the specification or in the claims

The invention claimed is:

1. A method comprising:
   switching a plurality of resistors to a first state, in which a first output of a test signal generator is connected via a first resistor of the plurality of resistors to a first wire of a first digital subscriber line of a plurality of subscriber lines, and a second output of the test signal generator is connected via a second resistor of the plurality of resistors to a second wire of the first digital subscriber line;
   providing in the first state one or more signals from the test signal generator to the first digital subscriber line;
   switching the plurality of resistors to a second state, in which the first output of the test signal generator is connected via a third resistor of the plurality of resistors to a first wire of a second digital subscriber line, and the second output of the test signal generator is connected via a fourth resistor of the plurality of resistors to a second wire of the second digital subscriber line; and
   providing in the second state one or more signals from the test signal generator to the second digital subscriber line.

2. The method according to claim 1, further comprising, after providing one or more signals in the first state, connecting the first wire of the first digital subscriber line to ground and connecting the second wire of the first digital subscriber line to ground; and
   disconnecting the first output of the test signal generator from the first wire of the first digital subscriber line and disconnecting the second output of the test signal generator from the second wire of the first digital subscriber line.

3. The method according to claim 2, wherein in the first state the second subscriber line is connected to ground via the third and fourth resistors.

4. The method according to claim 3, wherein during a transition from the first to the second state, the first wire of the first digital subscriber line is connected via the first resistor both to ground and to the first output of the test signal generator; and wherein during the transition from the first to the second state, the second wire of the first digital subscriber line is connected via the second resistor both to ground and to the second output of the test signal generator; and wherein during the transition from the first to the second state, the first wire of the second digital subscriber line is connected via the third resistor both to ground and to the first output of the test signal generator; and wherein during the transition from the first to the second state, the second wire of the second digital subscriber line is connected via the fourth resistor both to ground and to the first output of the test signal generator.

5. The method according to claim 1, wherein the value of the first, second, third and fourth resistor is between 5 kOhm and 50 kOhm.

6. The method according to claim 4, wherein the switching is provided by controlling a matrix of switches, wherein a resistance value of the switches in on-state is significantly lower than the resistance value of the first, second, third and fourth resistor.

7. The method according to claim 1, wherein in the first state, a first signal transmitted between the first output of the test signal generator and the first wire of the first digital subscriber line and a second signal transmitted between the second output of the test signal generator and the second wire of the first digital subscriber line, are substantially not low-pass filtered.

8. The method according to claim 1, further comprising:
   controlling the test signal generator in the first state to output a signal inducing a wetting current in the first and second wires of the first digital subscriber line via the first and second resistors; and
   controlling the test signal generator in the second state to output a signal inducing a wetting current in the first and second wires of the second digital subscriber line via the third and fourth resistors.

9. The method according to claim 8, wherein the test signal generator includes a first and second amplifier, wherein the first and second amplifier are controlled to provide a wetting current as well as metallic line test signals in the first and second states.

10. The method according to claim 1, further comprising:
    measuring a voltage induced by the one or more signals in the first state at the first and second wires of the first digital subscriber line and determining metallic line testing parameters based on the measured voltages, and
    measuring a voltage induced by the one or more signals in the second state at the first and second wires of the second digital subscriber line and determining one or more metallic line testing parameters based on the measured voltages.

11. The method according to claim 1, further comprising:
    providing in the first state one or more signals, measuring provided signals on the first digital subscriber line and determining one or more metallic line testing parameters based on the measurement; and
    providing in the second state one or more signals, measuring provided signals on the second digital subscriber line and determining one or more metallic line testing parameters based on the measurement.

12. The method according to claim 1, wherein the one or more signals are provided in the first switching state during a digital data communication on at least the first digital subscriber line and the one or more signals are provided in the second switching state during a digital data communication on at least the second digital subscriber line.

* * * * *